United States Patent [19]

Konishi et al.

[11] Patent Number: 4,926,359
[45] Date of Patent: May 15, 1990

[54] WEIGHT SENSING APPARATUS

[75] Inventors: Satoshi Konishi, Kusatsu; Kazufumi Naito, Ohtsu; Mitito Utsunomiya, Kusatsu, all of Japan

[73] Assignee: Kabushiki Kaisha Ishida Koki Seisakusho, Kyoto, Japan

[21] Appl. No.: 346,288

[22] Filed: May 1, 1989

Related U.S. Application Data

[63] Continuation of Ser. No. 243,190, Sep. 8, 1988, abandoned, which is a continuation of Ser. No. 75,259, Jul. 16, 1987, abandoned, which is a continuation of Ser. No. 599,782, Apr. 13, 1984, abandoned.

[30] Foreign Application Priority Data

Apr. 14, 1983 [JP] Japan .................. 58-66212
Apr. 14, 1983 [JP] Japan .................. 58-66213

[51] Int. Cl.$^5$ ................ G01G 23/10; G01G 19/00
[52] U.S. Cl. .................... 364/567; 364/466; 777/485
[58] Field of Search ......... 364/567, 466, 571.01, 364/571.05, 571.06; 177/185, 187

[56] References Cited

U.S. PATENT DOCUMENTS

| | | | |
|---|---|---|---|
| 3,670,833 | 6/1972 | Tomohiko et al. | 177/185 X |
| 3,912,029 | 8/1974 | Gorman et al. | 177/210 |
| 4,155,411 | 5/1979 | Weaver | 364/567 X |
| 4,212,361 | 2/1979 | Stocker | 177/200 |
| 4,236,222 | 11/1980 | Loshbough et al. | 364/466 X |
| 4,379,495 | 4/1983 | Cocks et al. | 364/466 X |
| 4,396,080 | 8/1983 | Dee | 177/185 |
| 4,417,631 | 11/1983 | Johnson | 364/567 X |
| 4,529,050 | 7/1985 | Mosher et al. | 364/567 X |
| 4,531,600 | 7/1985 | Langlais et al. | 177/185 |
| 4,593,778 | 6/1986 | Konishi et al. | 177/185 |
| 4,624,331 | 11/1986 | Naito | 177/185 |
| 4,661,920 | 4/1987 | Haze | 364/571.05 |
| 4,691,290 | 9/1987 | Griffin | 364/567 |
| 4,705,126 | 11/1987 | Naito | 177/185 X |
| 4,751,973 | 6/1988 | Freeman et al. | 177/185 X |

FOREIGN PATENT DOCUMENTS 2732052 2/1979 Fed. Rep. of Germany .
5621409 1/1981 Switzerland .

Primary Examiner—Gary Chin
Assistant Examiner—Joseph L. Dixon
Attorney, Agent, or Firm—Staas & Halsey

[57] ABSTRACT

A weight sensing apparatus has a weight sensor provided with a load cell for producing an output signal indicative of the weight of an article, and a support for supporting the weight sensor. The apparatus includes oscillation sensing means provided in the vicinity of the load cell for producing an output signal indicative of an oscillation component caused by floor oscillation, a summing amplifier for adding the output signal from the load cell and a signal which is the inverse of the output signal from the oscillation sensing means, and signal processing means for processing the output of the summing amplifier to remove an oscillation component contained in the output signal from the load cell. The oscillation component is caused by oscillation received by the weight sensor from its surroundings.

8 Claims, 5 Drawing Sheets

4,926,359

WEIGHT SENSING APPARATUS

This is a continuation of co-pending application Ser. No. 243,190, filed on Sept. 8, 1988, which is a continuation of Ser. No. 075,259, filed on July 16, 1987, which is a continuation of Ser. No. 599,782, filed Apr. 13, 1984, all now abandoned.

BACKGROUND OF THE INVENTION

This invention relates to a weight sensing apparatus and, more particularly, to a weight sensing apparatus suitable for use in a computerized weighing system.

Weighers adapted to weigh articles mechanically are gradually being replaced by weighers which rely upon electronic circuitry. A weighing system using electronic circuitry employs a load cell comprising a load-sensitive element and a strain gauge which is affixed to the load cell. The resistance of the strain gauge changes owing to strain imposed when the strain-sensitive element is subjected to an applied weight.

Load cell structures of the above-described type have already been disclosed in a number of patent publications, e.g., Japanese Patent Application No. 57-187744 and 57-198259, and Japanese Utility Model Application No. 57-161840.

The load cell in a weighing system is adapted to produce an analog signal indicative of the applied weight. The signal is amplified, converted into a digital value by an analog-to-digital converter (referred to as an A/D converter), and the digital value is delivered to a display unit where the value is displayed. With an ordinary weighing apparatus of this kind, weighing elements such as a weighing dish and the load cell proper experience a gradually attenuating oscillation on the order of several score Hertz owing to shock which is sustained when the operator places the articles to be weighed on the weighing dish. This oscillation is transmitted to the load cell, which develops noise as a result. This causes the numerical value displayed by the display unit to fluctuate, with considerable time being required for the value to stabilize. The operator must therefore wait for the oscillations to cease before he can read the value displayed. These oscillations are be referred to as "weighing system oscillation" in the following.

Weighing system oscillation can be reduced by inserting a low-pass filter, which has a very low cut-off frequency on the order of 5 to 10 Hz, in the amplifier circuit that amplifies the analog weight signal produced by the load cell. This makes it possible to cut-off the oscillation frequency to the extent that the operator can read the displayed numerical value only a short time after placing the articles on the weighing dish. However, even stationary structures supporting the load cell, as well as the weighing apparatus proper, experience oscillation with respect to the environment in which the apparatus is installed. Such oscillation derives from ground vibration, as well as from vibration of the building itself, the floor on which the apparatus is set, supporting framework, etc. Such oscillation sustained by the load cell is referred to as "floor oscillation" in the following. Electrical oscillation caused by floor oscillation poses a special problem. Specifically, the abovementioned low-pass filter is capable of eliminating frequencies of 10 Hz or more; frequencies below this value act upon the weight signal. If a low-pass filter having an even lower cut-off frequency is inserted in the amplifier circuit in order to reduce the lower frequencies, too much time will be needed for the displayed value to attain the value indicated by the weight signal. The result will be a slower weighing speed, making it impossible to achieve a high-speed weighing operation.

Computerized weighing systems have been developed in recent years. With a weighing system of this type, a computer is adapted to form a plurality of weight values obtained from a plurality of weighing hoppers into a number of combinations, calculate the total weight of the values in each combination, and obtain a total weight value which is equal or nearest to a predetermined target weight value. Since a computerized weighing system is characterized by the fact that weighing can be performed at high speed, the weight values obtained from the weighing hoppers ought to be applied to the computer immediately after the articles to be weighed are introduced into the hoppers. However, since a computerized weighing system is installed in a factory or the like, the environmental conditions are even worse than those experienced by the ordinary weighing apparatus, and the so-called floor oscillation that acts upon the system is accompanied by supporting frame oscillation that derives from the operation of peripheral equipment. In consequence, the weight values cannot be fed into the computer immediately after articles are charged into the weighing hoppers. This is an impediment to high-speed weighing and makes necessary a troublesome operation in which the floor oscillation characteristic, which differs depending upon the place of installation, is measured on-site, followed by resetting the cut-off frequency of the low-pass filter on the basis of the data obtained from the measurements. The maximum weighing speed at which the weighing system can operate with good weighing precision represents the limit upon the weighing speed achievable at the place of installation.

SUMMARY OF THE INVENTION

An object of the present invention is to provide a novel weight sensing apparatus which is capable of overcoming the foregoing limitations upon high-speed weighing to make possible an improvement in weighing speed.

Another object of the present invention is to provide a weight sensing apparatus in which floor oscillation has no influence upon weighing precision.

Still another object of the present invention is to provide a weight sensing apparatus in which, through a simple construction and inexpensive component parts, noise voltage caused by floor oscillation can be removed from a signal indicative of sensed weight.

According to the present invention, a dummy load cell is provided in the vicinity of a load cell adapted to produce an output signal indicative of the weight of a batch of articles. The dummy load cell has a construction and a sensing output level identical with those of the load cell. When floor oscillation occurs during a weighing operation and causes the weight sensing system containing the load cell to oscillate, the dummy load cell senses the floor oscillation and produces an output signal indicative thereof. A summing amplifier is provided for adding the output of the load cell and a signal which is the inverse of the dummy cell output, whereby an output component ascribable to floor oscillation and contained in the output of the load cell is cancelled by the output of the dummy cell.

In another embodiment of the invention, the dummy load cell is replaced by an oscillation sensor for sensing floor oscillation, and an amplifier is provided for amplifying the output of the sensor. When the weight sensing system containing the load cell oscillates owing to floor oscillation during a weighing operation, the sensor senses a noise voltage attributable to the floor oscillation and produces a corresponding output signal which is amplified to a predetermined magnitude by the amplifier so that the amplitude thereof is brought into conformance with the amplitude of a noise voltage contained in the load cell output, which noise voltage is caused by the floor oscillation. Thereafter, the inverse of this signal is added to the output of the load cell, whereby the floor oscillation noise voltage contained in the load cell output signal is cancelled.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Reference will now be had to the drawings to describe embodiments of the present invention in detail.

Figure 1:
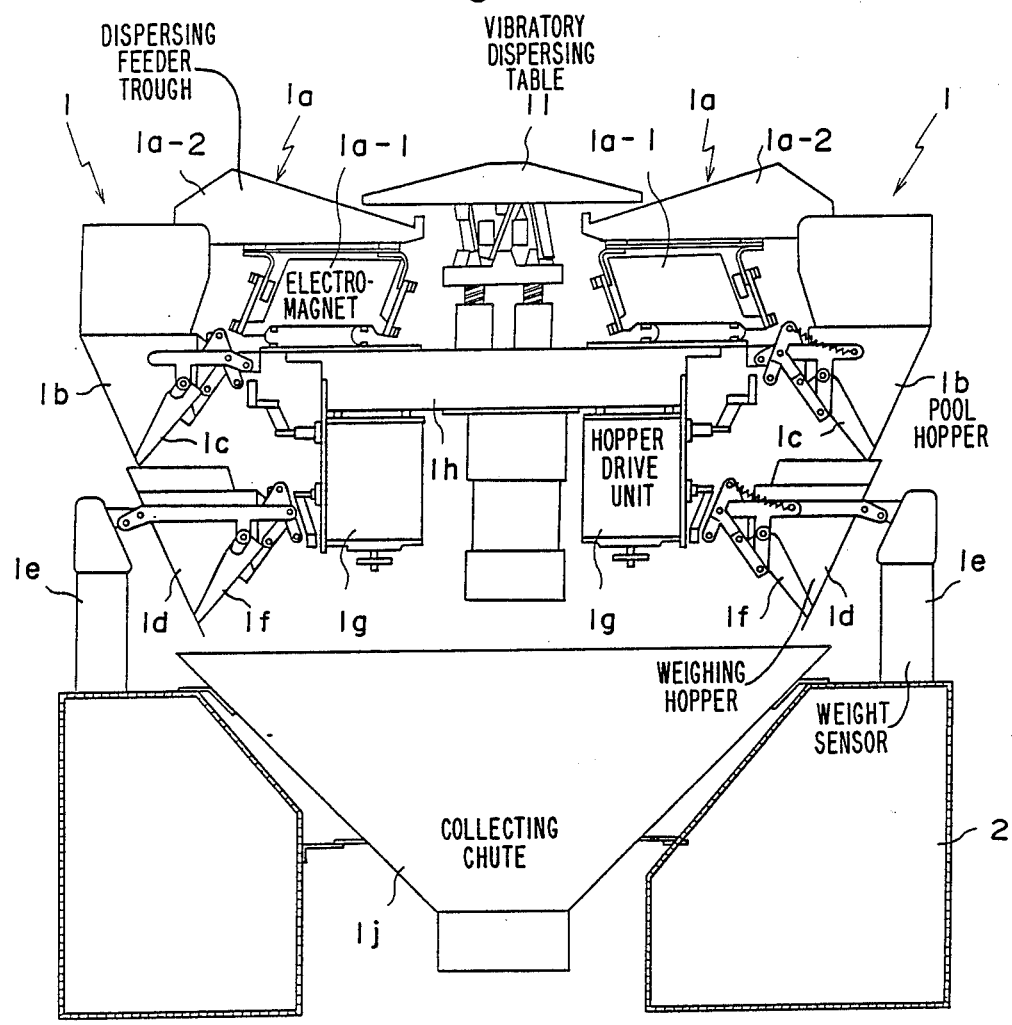
FIG. 1 is a side view illustrating a computerized combinatorial weighing system to which the weight sensing apparatus of the present invention is applied.

FIG. 1 illustrates a computerized weighing system capable of performing combinatorial weighing, and represents a weighing system to which the present invention is applied. Numeral 11 denotes a dispersing table of vibratory conveyance-type. Articles to be weighed are introduced onto the dispersing table 11 and imparted with vibratory motion for a predetermined length of time so as to be dispersed radially outward from the center of the table. Numerals 1, . . . 1 denote a number n of weighing stations which are arranged around the dispersing table 11 along radially extending lines to receive the articles dispersed by the table. Each weighing station includes a dispersing feeder $1a$, a pool hopper $1b$, a pool hopper gate $1c$, a weighing hopper $1d$, a weight sensor $1e$, a weighing hopper gate $1f$, and a hopper drive unit $1g$. Each weighing hopper $1d$ and weight sensor $1e$ constitute a weighing machine. The dispersing feeders $1a$ are arranged radially on a support platform $1h$ so as to surround the dispersing table 11, and each includes an electromagnetic vibrator $1a$-1 and a trough $1a$-2. Articles supplied to the trough $1a$-2 from the dispersing table 11 fall into the corresponding pool hopper $1b$ from the end of the through, owing to the linear reciprocating motion of the electromagnet $1a$-1. The pool hopper gate $1c$, which is provided on the respective pool hopper $1b$, is opened under the control of a hopper drive unit $1g$, whereupon the articles contained in the pool hopper $1b$ are released into the corresponding weighing hopper $1d$. Each of the weight sensors $1e$ attached to a respective one of the weighing hoppers $1d$ is operable to measure the weight of the articles introduced into the corresponding weighing hopper, and to apply an electrical signal indicative of the measured weight to a combination processing unit, which is not shown. The combination processing unit then obtains the optimum combination by performing processing for combinatorial weighing. The hopper drive unit $1g$ is adapted to open only the weighing hopper gates of those weighing machines that give the optimum combination, whereby the articles contained in these weighing machines are discharged into a common chute $1j$ where they are collected together. The collecting chute $1j$ has the shape of a conical or polygonal funnel and is so arranged as to receive the articles from any of the circularly arrayed weighing hoppers $dd$ via the weighing hopper gates, which are located above the funnel substantially along its outer rim. The articles received by the collecting chute $1j$ are collected at the centrally located lower end thereof by falling under their own weight or by being forcibly shifted along the inclined wall of the funnel by a mechanical scraper or the like, which is not shown. Numeral 2 denotes a base supported by a platform which is not shown.

Figure 2:
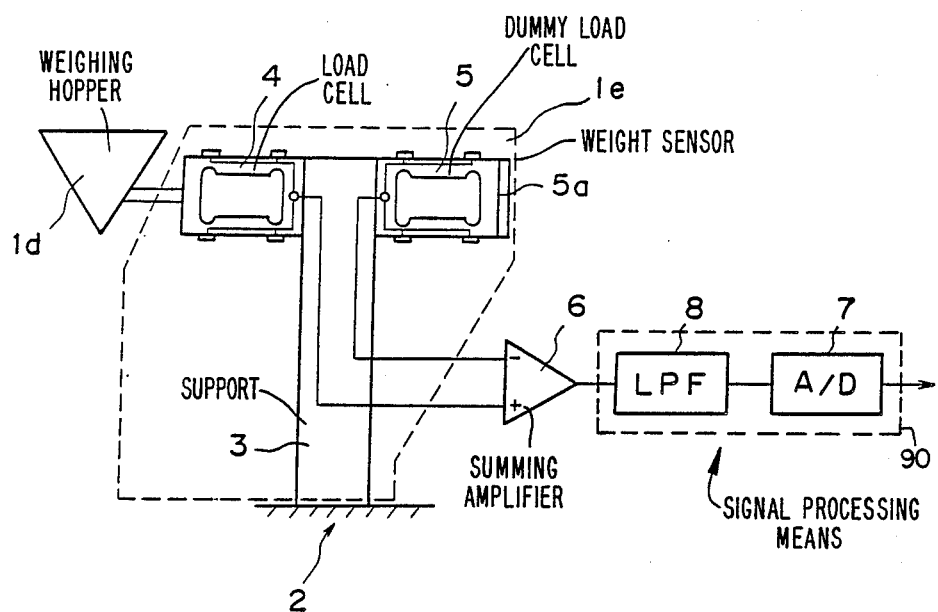
FIG. 2 is a circuit diagram illustrating an embodiment of a weight sensing apparatus according to the present invention.

FIG. 2 illustrates the circuitry of a weight sensing apparatus according to the present invention. A load cell 4 is provided within each weight sensor $1e$ of the weighing system shown in FIG. 1. The load cell 4 has one end thereof secured to a support 3 erected on the base 2, and has a corresponding one of the weighing hoppers $1d$ mounted on the other end thereof. When articles to be weighed are introduced into the weighing hopper $1d$, the load cell 4 produces an analog voltage proportional to the weight of the article batch. Secured at one end of the support 3, on the side thereof opposite the load cell 4, is a dummy load cell 5 comprising a load cell having a construction and sensing output level identical with that of the load cell 4. Attached to the other end of the load cell 5 is a weight $5a$ equivalent in weight to the weighing hopper $1d$ and, hence, representing the tare of the weighing hopper. The dummy load cell 5 also produces an analog voltage, which is proportional to the magnitude of the weight $5a$. A summing amplifier 6 has a positive input terminal which receives the analog output of the load cell 4, and a negative input terminal which receives the analog output of the dummy load cell 5. The output of the summing amplifier 6 is applied to an A/D converter 7 upon passing through a low-pass filter 8. The low-pass filter 8 reduces noise, which is contained in the output of the summing amplifier 6, caused by weighing system oscillation when articles are dumped into the weighing hopper $1d$. The A/D converter 7 converts the analog output of the low-pass filter 8, which signal is indicative of the sensed weight of the articles, into a digital value. Thus, the A/D converter 7 and low-pass filter 8 construct signal processing means 90 for processing the output of the summing amplifier 6.

In operation, the outputs of the load cell 4 and dummy load cell 5 both correspond to tare when the weighing hopper $1d$ is empty. However, these outputs are corrected to give weight values of zero, so that the output of the summing amplifier 6 is zero.

Figure 3:
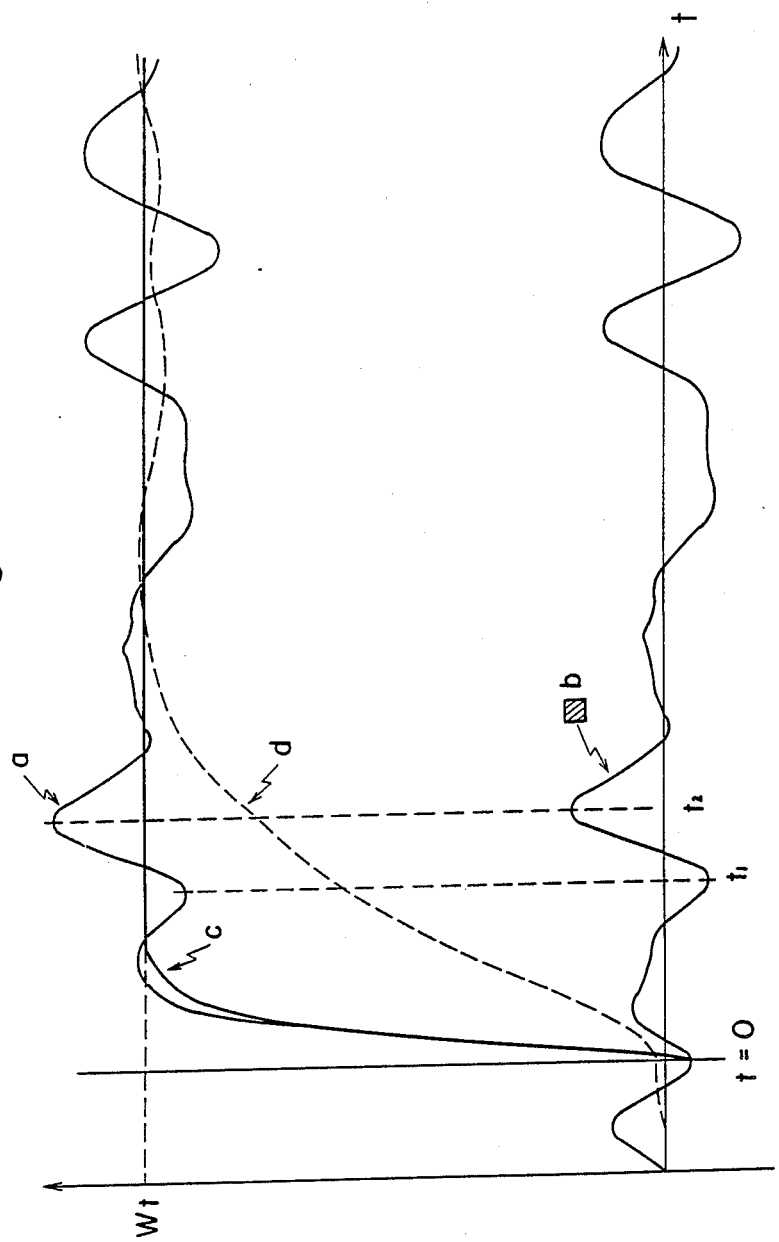
FIG. 3 is a graph of load cell outputs and is useful in describing the operation of the embodiment of the present invention.

To perform a weighing operation, articles to be weighed are charged into the weighing hopper $1d$. The load cell 4 produces an analog output voltage proportional to the weight of the articles introduced, and the signal is applied to the summing amplifier 6. The support 3, load cell 4 and weighing hopper 1d, however, are continuously affected by floor oscillation, in addition to the weighing system oscillation caused by the introduction of the articles into the weighing hopper 1d. These elements therefore are set into oscillation. Noise due to the weighing system oscillation is removed by the low-pass filter 8. Since this operation has been described above, no further description in this connection is necessary here. Though the noise induced by the system oscillation is removed, the load cell 4 also responds to the floor oscillation, so that the output of the load cell includes noise attributed to the latter oscillation. More specifically, as shown by the curve (a) in FIG. 3, the analog signal produced by the load cell 4 rises toward a weight value Wt, which is indicative of the weight of the articles in the weighing hopper, where t=0 represents the instant at which the articles are charged into the hopper. Since the load cell output includes a component ascribable to floor oscillation, the magnitude of the output signal falls below the weight value Wt at time $t_1$ and exceeds the weight value Wt at time $t_2$. Thus, owing to floor oscillation, the output of the load cell 4 fluctuates about the weight value Wt. When floor oscillation occurs, therefore, the load cell output does not stabilize at the weight value Wt, with the result that the weight signal is applied to the weighing system computer while still changing. This poses an obstacle to a highly accurate weighing operation. It should be noted that the output waveform attributable to floor oscillation is shown in exaggerated form in FIG. 3 to facilitate the description.

The dummy load cell 5, meanwhile, receives no load from the articles being weighed and, hence, produces an output indicative of tare. However, since the dummy load cell 5 has the same construction as, and is located nearby, the load cell 4, it responds to the floor oscillation in the same way as the load cell 4 and produces an output signal having a waveform (b). It will be seen in FIG. 3 that the waveform (b) fluctuates in a manner analogous to that of the waveform (a) because both respond similarly to floor oscillation. The output signal of waveform (b) is applied to the summing amplifier 6. As a result, the summing amplifier 6 in effect combines the curve (a) with the inverse of the curve (b), thereby cancelling the floor oscillation noise component contained in the analog output signal of the load cell 4. The resulting signal, namely the output of the summing amplifier 6, has the waveform indicated by the curve (c) in FIG. 3. Thus, following introduction of the articles into the weighing hopper 1d, the output of the summing amplifier 6 takes on the weight value Wt of the article batch from time $t_1$ onward. With the prior-art arrangement in which use is made of a low-pass filter capable of reducing the noise induced by floor oscillation, the output signal obtained is as shown by dashed curve (d). It will be understood by comparison that the output of the summing amplifier 6 in the apparatus of the present invention approaches the weight value Wt much more rapidly, and that even low-frequency noise which cannot be extracted by a low-pass filter is cancelled almost completely.

Figure 4:
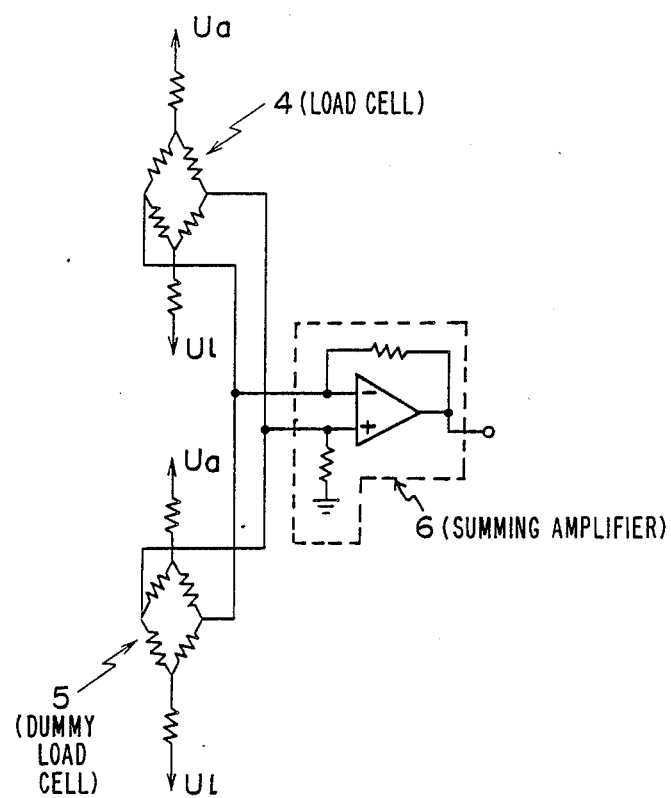
FIG. 4 is a circuit diagram showing a weight sensing apparatus according to the present invention.

FIG. 4 is a diagram of an actual circuit illustrating the weight sensor 1e and summing amplifier 6. The load cell 4 and dummy load cell 5 each comprise strain gauges connected into the form of a bridge, and the outputs thereof are connected to the summing amplifier 6 upon being reversed in phase with respect to each other.

Thus, according to the present invention, a weight sensing apparatus includes a weighing load cell and a dummy load cell disposed in the vicinity of the weighing load cell and having the same construction and sensing output level, i.e., the same characteristics, as the weighing load cell. The oscillatory output of the dummy load cell is reversed in phase and added to the output of the weighing load cell to cancel the floor oscillation component. The apparatus of the invention therefore provides a noise removal effect far superior to that obtained with the prior art, in which a low-pass filter having a very low cut-off frequency is inserted in the weight sensing circuitry to reduce noise attributed to floor oscillation. Since the excellent noise removal effect of the invention shortens the time needed for a weight indicating signal to stabilize, weighing can be performed at a higher speed with great accuracy. Accordingly, in a computerized weighing system for performing combinatorial weighing, weight signals from the weighing hoppers can be applied to the computer immediately after the weighing hoppers are supplied with articles. In comparison with the conventional apparatus, therefore, weighing can be performed more rapidly and with greater precision. The present invention also is applicable to a so-called electronic weigher, namely a weighing apparatus that relies upon electronic circuitry to weigh articles through use of a single load cell. Since the invention enables such an apparatus to display a weight value at the same time that the operator places articles on a weighing dish, the weighing operation can be performed in a rapid manner. The invention also makes it possible to carry out weighing with satisfactory precision even under oscillatory environmental conditions that render such weighing impossible with the conventional arrangements. It is also unnecessary to set the cut-off frequency of the low-pass filter on-site.

Figure 5:
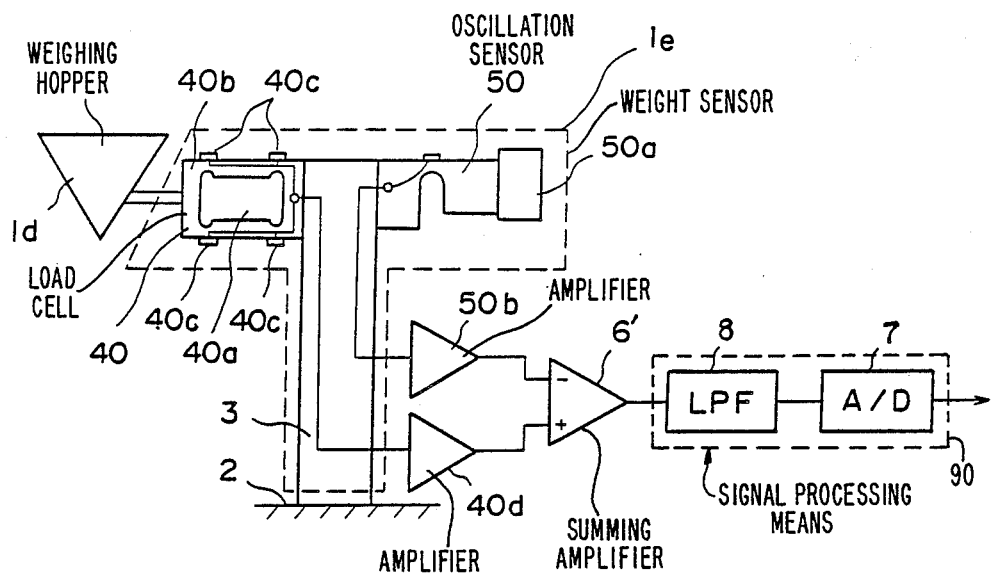
FIG. 5 is a circuit diagram illustrating another embodiment of a weight sensing apparatus according to the present invention.

Another embodiment of weight sensing apparatus according to the present invention will be described with reference to FIG. 5, which illustrates the circuitry of the apparatus. Portions similar to those shown in FIG. 2 are designated by like reference characters and are not described again. Numeral 40 denotes a load cell provided within each of the weight sensors 1e of the system shown in FIG. 1. The load cell 40 has an elongated configuration and includes a strain-sensitive element 40b consisting of a ferrous or non-ferrous alloy and having an opening 40a at the center thereof. Provided on a portion of the outer periphery of the strain-sensitive element 40b is a weight sensing portion comprising a bridge circuit including strain gauges 40c the resistance whereof varies with strain. One end of the strain-sensitive element 40b is secured to the support 3, the other end whereof has the weighing hopper 1d attached thereto. When articles to be weighed have been charged into the weighing hopper 1d, the load cell 40 produces an analog voltage proportional to the weight of the article batch. The analog voltage output of the load cell is amplified by an amplifier 40d. An oscillation sensor 50 is provided in the proximity of the load cell 40. In the present embodiment of the invention, the oscillation sensor 50 employs a load cell of a construction different from that of the load cell 40. One end of the oscillation sensor 50 is secured to the support 3. Attached to the other end of the oscillation sensor 50 is a weight 50a corresponding to the weight of the weighing hopper 1d. In other words, the weight 50a is equivalent to the tare of the weighing hopper 1d. Since the oscillation sensor 50 is solely for the purpose of sensing floor oscillation, the sensor may comprise an inexpensive load cell having a construction and sensing output level different from those of the load cell 40. Alternatively, the oscillation sensor 50 may comprise an oscillating body constituted by a permanent magnet and disposed within an oscillation sensing coil, with the arrangement being such that a noise voltage attributable to floor oscillation is produced by the sensing coil when the oscillating body is set into oscillatory motion by the floor oscillation. In other words, any arrangement will suffice so long as floor oscillation is sensed and a noise voltage ascribable thereto is produced. An amplifier 50b amplifies the output of the oscillation sensor 50 and brings the level of the signal into conformance with the level of the noise voltage contained in the output signal of the amplifier 40d, which noise voltage is ascribable to floor oscillation picked up by the load cell 40. The single summing amplifier 6' in the present embodiment receives the output of the load cell 40 at its positive input terminal, and the output of the oscillation sensor 50 at its negative input terminal from the single pair of signal level matching amplifiers 50b and 40d, respectively.

To perform a weighing operation, articles to be weighed are charged into the weighing hopper 1d. The load cell 40 produces an analog output voltage proportional to the weight of the articles introduced, and the signal is applied to the positive input terminal of the summing amplifier 6' following amplification by the amplifier 40d.

The oscillation sensor 50, meanwhile, receives no load from the articles being weighed and, hence, produces an output indicative of tare. However, since the oscillation sensor 50 responds to the floor oscillation in the same way as the load cell 40, an output signal having an oscillatory waveform ascribable to floor oscillation appears at the output terminal thereof. The oscillatory waveform is amplified by the amplifier 50b and emerges as an output signal having the same oscillation component and the same level as the output of the amplifier 40d. This signal is applied to the negative input terminal of the summing amplifier 6'. Consequently, as described earlier in connection with the first embodiment with reference to FIG. 3, the summing amplifier 6' cancels the floor oscillation noise component from the analog signal produced by the load cell 40. As a result, the invention provides an excellent floor oscillation noise removal effect and shortens the period of time the weight signal is unstable. This allows weighing to be performed quickly and more accurately. In addition, the oscillation sensor 50 is an element which is inexpensive in comparison with the load cell 40. Therefore, in weighing systems that rely upon a large number of load cells, such as a computerized weighing system for combinatorial weighing, the overall system can be manufactured at reduced cost.

While the present invention has been applied to a computerized combinatorial weighing system in each of the foregoing embodiments, the invention is in no way limited to such applications. It goes without saying that the invention can also be applied to a weighing apparatus which uses electronic circuitry, namely a so-called electronic weigher for weighing articles through use of a single load cell. Further, in a computerized weighing system, the load cells and dummy load cells need not be equivalent in number, though this is the arrangement adopted in the first embodiment. Instead, an arrangement is possible in which floor oscillation noise can be cancelled for all load cells by one or a small number of dummy load cells.

As many apparently widely different embodiments of the present invention can be made without departing from the spirit and scope thereof, it is to be understood that the invention is not limited to the specific embodiments thereof except as defined in the appended claims.

What we claim is:

1. A weight sensing apparatus for sensing the weight of an article, comprising:
   a weight sensor including a load cell for producing a respective output signal indicative of the weight of the article, said output signal including floor oscillations transmitted to said weight sensor;
   oscillation sensing means different construction from said weight sensor and provided in the vicinity of the load cell, for producing a respective output signal indicative of said floor oscillations transmitted to said oscillation sensing means, said oscillation sensing means being located to provide a correspondence between said respective output signal of said oscillation sensing means and a respective component of said output signal of said weight sensor corresponding to said floor oscillations;
   a single pair of single signal level matching amplifiers, one connected to the load cell and one connected to said oscillation sensing means and both producing output signals;
   a single summing amplifier means for summing the output signal from the signal level amplifier corresponding to the load cell and the output signal from the signal level amplifier corresponding to said oscillation sensing means, and for generating a respective output corresponding to the weight of said article with the floor oscillations removed; and
   signal processing means for removing a weight system oscillation component contained in the output from the summing amplifier means, which oscillation component is caused by weight system oscillations received by the weight sensor.

2. The weight sensing apparatus of claim 1, said oscillation sensing means comprising a dummy load cell for producing said output signal of said oscillation sensing means.

3. The weight sensing apparatus of claim 2, wherein said dummy load cell has a sensing output level that is identical with that of said load cell.

4. The weight sensing apparatus of claim 1, said summing amplifier means comprising a summing amplifier for adding the output signal from one of said pair of signal level amplifiers and a signal which is the inverse of the output signal from the other of said pair of signal level amplifiers.

5. The weight sensing apparatus of claim 1, comprising signal processing means connected to the output of the summing amplifier means for smoothing said output.

6. The apparatus of claim 1, comprising a weighing hopper attached to said weight sensor, and a weight of the same weight as said weighing hopper attached to said oscillation sensing means.

7. The apparatus of claim 1, 2, 3, 4, 5 or 6, comprising a support for supporting both said weight sensor and said oscillation sensing means.

8. The apparatus of claim 7, wherein said weight sensor is located on said support in the same vicinity as said oscillation sensing means.

* * * * *